United States Patent
Nishimura et al.

(10) Patent No.: US 8,739,646 B2
(45) Date of Patent: Jun. 3, 2014

(54) ROLLER SCREW AND METHOD OF CIRCULATING ROLLERS IN ROLLER SCREW

(75) Inventors: Kentaro Nishimura, Tokyo (JP); Tetsuya Miura, Tokyo (JP); Akimasa Yoshida, Tokyo (JP); Soshi Miyahara, Tokyo (JP); Yusuke Todoroki, Tokyo (JP); Takashi Sakuyama, Tokyo (JP)

(73) Assignee: THK Co., Ltd., Tokyo (JP)

( * ) Notice: Subject to any disclaimer, the term of this patent is extended or adjusted under 35 U.S.C. 154(b) by 506 days.

(21) Appl. No.: 12/744,175
(22) PCT Filed: Nov. 14, 2008
(86) PCT No.: PCT/JP2008/070748
§ 371 (c)(1),
(2), (4) Date: Jun. 16, 2010
(87) PCT Pub. No.: WO2009/069478
PCT Pub. Date: Jun. 4, 2009

(65) Prior Publication Data
US 2010/0282011 A1    Nov. 11, 2010

(30) Foreign Application Priority Data

Nov. 30, 2007   (JP) ................................. 2007-309609

(51) Int. Cl.
*F16H 25/22*    (2006.01)
(52) U.S. Cl.
CPC .... *F16H 25/2247* (2013.01); *F16H 2025/2271* (2013.01)
USPC ..................................................... 74/424.87
(58) Field of Classification Search
CPC ..................... F16H 2025/2271; F16H 25/2247
USPC ................ 74/424.81–424.83, 424.86, 424.87
See application file for complete search history.

(56) References Cited

U.S. PATENT DOCUMENTS 3,580,098 A * 5/1971 Goad .......................... 74/424.87
3,722,312 A * 3/1973 Better et al. .................. 74/89.42

(Continued)

FOREIGN PATENT DOCUMENTS

JP    6-288458 A    10/1994
JP    11-210858 A    8/1999

(Continued)

OTHER PUBLICATIONS

Japanese Office Action dated Sep. 28, 2010, issued in corresponding Japanese Patent Application No. 2009-543755.

(Continued)

*Primary Examiner* — David M Fenstermacher
*Assistant Examiner* — Terence Boes
(74) *Attorney, Agent, or Firm* — Westerman, Hattori, Daniels & Adrian, LLP

(57) ABSTRACT

There is provided a roller screw in which a twisted amount of an unloaded return path is reduced.

The roller screw has a screw shaft 1 having a spiral roller-rolling surface 1*a* on an outer peripheral surface thereof; a nut 2 having a spiral loaded roller-rolling surface 2*a* on an inner peripheral surface thereof, the spiral loaded roller-rolling surface being opposed to the roller-rolling surface 1*a* of the screw shaft 1; a circulation member 7 arranged in the nut 2 and formed to have an unloaded return path 8 connecting one end and the other end of the loaded roller-rolling surface 2*a*, whose turn number is less than one, of the nut 2; and a plurality of rollers 4 arranged in a one-turn roller circulation path composed by a loaded roller-rolling path 6 and the unloaded return path 8. The circulation member 7 guides the rollers which have moved and arrived at the one end of the loaded roller-rolling path 6 having less than one turn, to the unloaded return path 8, and then returns the rollers to the other end of the loaded roller-rolling path 6 having less than one turn. The number of turns of the loaded roller-rolling path 6 is set to be less than one turn, whereby the rollers 4 which have arrived at one end of the loaded roller-rolling path 6 can be transferred to the other end of the loaded roller-rolling path 6 without changing their attitudes.

4 Claims, 17 Drawing Sheets

(56) References Cited

U.S. PATENT DOCUMENTS

| | | | |
|---|---|---|---|
| 4,905,534 A * | 3/1990 | Andonegui | 74/424.87 |
| 6,397,697 B1 | 6/2002 | Ninomiya et al. | |
| 6,481,305 B2 | 11/2002 | Nishimura et al. | |
| 2001/0017062 A1 | 8/2001 | Nishimura et al. | |
| 2009/0070078 A1 * | 3/2009 | Miyahara et al. | 703/1 |
| 2010/0263467 A1 * | 10/2010 | Miyahara et al. | 74/424.87 |

FOREIGN PATENT DOCUMENTS

| | | |
|---|---|---|
| JP | 2000-161459 A | 6/2000 |
| JP | 2000-320637 A | 11/2000 |
| JP | 2001-241527 A | 9/2001 |
| JP | 2003-329097 A | 11/2003 |
| JP | 2006-118649 A | 5/2006 |
| JP | 2006-153216 A | 6/2006 |
| WO | 03/095869 A1 | 11/2003 |
| WO | 2006/051706 A1 | 5/2006 |

OTHER PUBLICATIONS

International Search Report of PCT/JP2008/070748, mailing date of Dec. 16, 2008.
Japanese Office Action dated Jun. 29, 2010, issued in corresponding Japanese Patent Application No. 2009-543755.
Notification of Transmittal of Translation of the International Preliminary Report on Patentability (Form PCT/IB/373) of International Application No. PCT/JP2008/070748 mailed Aug. 10, 2010 with Forms PCT/ISA/237.
Japanese Office Action dated Dec. 21, 2010, issued in corresponding Japanese Patent Application No. 2009-543755.

* cited by examiner

ROLLER SCREW AND METHOD OF CIRCULATING ROLLERS IN ROLLER SCREW

TECHNICAL FIELD

The present invention relates to a roller screw in which rollers are arranged between a screw shaft and a nut so that the rollers can be rolled.

BACKGROUND ART

Recently, roller screws have been developed, in each of which rollers are arranged between a screw shaft and a nut so that the rollers can be rolled. Because of a linear contact between the rollers and a roller-rolling surface, the roller screws are advantageous over ball screws in that the roller screws are able to sustain an amount of load larger than that of the ball screws. However, when being compared to balls which are able to roll in all directions, the roller screws are disadvantageous in that it is very difficult to circulate the rollers due to the fact that the rollers are allowed to roll along only one direction.

The roller screw has a circulation path configured by a loaded roller-rolling path, which is produced between a spiral roller-rolling surface of the outer peripheral surface of the screw shaft and a spiral loaded roller-rolling surface of an inner peripheral surface of the nut, and an unloaded return path connecting one end and the other end of the loaded roller-rolling path. The unloaded return path is formed on a circulation member attached to the nut. When the screw shaft is rotated relatively to the nut, the circulation member scoops up the rollers that have rolled and arrived at the one end of the loaded roller-rolling path, and allows the rollers to pass through the unloaded return path, so that the rollers returns to the other end of the loaded roller-rolling path. Arranging the circulation member makes it possible to form the unloaded return path.

In the conventional roller screw, the number of turns of the loaded roller-rolling path is set to be larger than 2 or 3. When a return pipe is used as the circulation member, the number of turns of the loaded roller-rolling path is set to, for example, 2.5 turns, 3.5 turns, or the like (refer to Patent reference 1). Meanwhile an end-cap type of circulation member is adopted, the number of turns of the loaded roller-rolling path is set to, for example, 3.8 turns, 4.8 turns, or the like (refer to Patent reference 2).

Patent reference 1: Japanese Patent Laid-open Publication No. 2001-241527
Patent reference 2: Japanese Patent Laid-open Publication No. 2006-118649

DISCLOSURE OF THE INVENTION

Problems to be Solved by the Invention

When the rollers scooped up from the one end of the loaded roller-rolling path is made to return to the other end of the other end thereof, it is required that the attitudes of the rollers agree with the sectional shape of the loaded roller-rolling path. To meet this requirement, the unloaded return path of the circulation member is twisted such that the rollers can be rotated to change their attitudes while the rollers pass through the unloaded return path. However, the larger is the twisted amount of the unloaded return path, the harder a smooth movement of the rollers through the unloaded return path. Conversely, the lesser the twisted amount given to the unloaded return path, the smoother the rollers in movement through the unloaded return path. In addition, when the circulation path through which the rollers pass becomes longer, the probability that the rollers tilt (i.e., the rollers are skewed) becomes higher as well.

The inventors have acquired knowledge that there is a correlation between the number of turns of the loaded roller-rolling path and the twisted amount of the unloaded return path. The present invention is based on this knowledge, and has an object to provide a roller screw and a method of circulating rollers in a roller screw, which are able to reduce the twisted amount which should be given to the unloaded return path.

Means for Solving the Problem

Hereinafter the present invention will now be described.

The invention provides a roller screw comprising: a screw shaft having a spiral roller-rolling surface on an outer peripheral surface thereof; a nut having a spiral loaded roller-rolling surface on an inner peripheral surface thereof, the loaded roller-rolling surface being opposed to the roller-rolling surface of the screw shaft; a circulation member arranged in the nut and formed to have an unloaded return path connecting one end and the other end of the loaded roller-rolling surface, whose turn number is less than one, of the nut; and a plurality of rollers arranged in a one-turn roller circulation path composed by a loaded roller-rolling path having less than one turn between the roller-rolling surface of the screw shaft and the loaded roller-rolling surface of the nut and an unloaded return path of the circulation member, wherein the circulation member is formed to guide the rollers which have rolled and arrived at one end of the loaded roller-rolling path of less than one turn to the unloaded return path and to return the rollers to the other end of the loaded roller-rolling path of less than one turn, when the screw shaft is relatively rotated to the nut.

The invention is characterized in that, the unloaded return path of the circulation member has a cross section closed to enclose the rollers, and the circulation member has scooping-up portions arranged at both ends of the unloaded return path in a length direction thereof, the scooping-up portions scooping up the rollers which have moved in the loaded roller-rolling path into the unloaded return path.

The invention is characterized in that, the unloaded return path of the circulation member has the cross section which is square in conformity with a shape of a side surface of each of the rollers and which is twisted so as to rotate attitudes of the rollers which move along the unloaded return path, and the circulation member is a member formed by combining two split members split at a position of a diagonal line of the unloaded return path of which section is square.

The invention is characterized in that, the number of turns of the loaded roller-rolling path having less than one turn is over 0.5 turns.

The invention is characterized in that, the nut has a placing hole which has a shape corresponding to a shape of the circulation member, which is through from an outer peripheral surface of the nut to an inner peripheral surface thereof, and which extends in a long and narrow form from one of both ends of the loaded roller-rolling surface of less than one turn to the other end thereof, and the circulation member is placed in the placing hole of the nut.

The invention provides a method of circulating rollers in a roller screw, guiding the rollers which have moved and arrived at one of ends of a loaded roller-rolling path having less than one turn, into an unloaded return path of the circulation member, wherein the loaded roller-rolling path is formed between a spiral roller-rolling surface on an outer peripheral surface of the screw shaft and a spiral loaded roller-rolling surface on an inner peripheral surface of a nut, and returning the rollers to the other end of the loaded roller-rolling path having less than one turn.

Advantageous Effects of the Invention

If a twisted amount given to the unloaded return path becomes smaller, the rollers can be moved more smoothly. The invention allows the number of turns of the loaded roller-rolling path to be less than one turn. Hence, it is possible to transfer the rollers, which have arrived at one end of the loaded roller-rolling path, to the other end of the loaded roller-rolling path without changing their attitudes (to be more accurate, without rotating their attitudes largely). As a result, the amount of twist of the unloaded return path can be made smaller. In addition, since the number of turns of the loaded roller-rolling path is less than one turn, it is possible to prevent the rollers from tilting from their predetermined attitudes (that is, the rollers from skewing), thanks to less influence on accuracy of machining the roller-rolling surface of the screw shaft and the loaded roller-rolling surface of the nut as well as a reduction in the number of rollers arranged in the loaded roller-rolling path.

In the invention, the rollers, whose side view is square, can be returned to a roller-rolling surface of the screw shaft, which is one-turn prior to the next one, without being touched to the screw thread of the screw shaft. Hence, the rollers can move smoothly along the unloaded return path.

In the invention, the split members are split along a diagonal line position of the unloaded return path, whereby no undercut of the split members is caused. Accordingly, this facilitates the production of the split members.

In the invention, the load capability of the roller screw can be enhanced.

In the invention, it becomes easier to load the circulation into the nut.

The invention allows the number of turns of the loaded roller-rolling path to be less than one turn. Hence, it is possible to transfer the rollers, which have arrived at one end of the loaded roller-rolling path, to the other end of the loaded roller-rolling path without changing their attitudes (to be more accurate, without rotating their attitudes largely). As a result, the amount of twist of the unloaded return path can be made smaller. In addition, since the number of turns of the loaded roller-rolling path is less than one turn, it is possible to prevent the rollers from tilting from their predetermined attitudes (that is, the rollers from skewing), thanks to less influence on accuracy of machining the roller-rolling surface of the screw shaft and the loaded roller-rolling surface of the nut as well as a reduction in the number of rollers arranged in the loaded roller-rolling path.

DESCRIPTION OF REFERENCES

1 . . . screw shaft, 1a . . . roller-rolling surface, 2 and 26 . . . nut, 2a . . . loaded roller-rolling surface, 2b . . . placing hole, 4 . . . roller, 6 . . . loaded roller-rolling path, 7 . . . deflector (circulation member), 7a and 7b . . . split members, 8 . . . unloaded return path, 8a . . . central part, 8b . . . both end parts

BEST MODE FOR CARRYING OUT THE INVENTION

Figure 1:
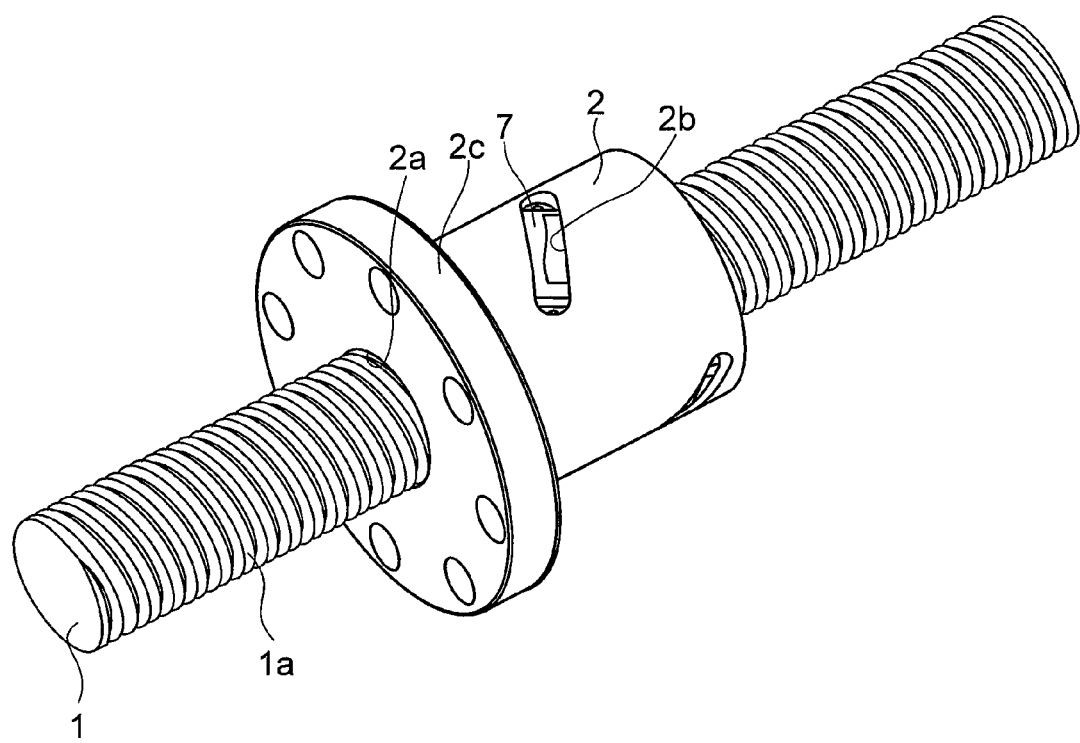
FIG. 1 is a perspective view showing a roller screw according to a first embodiment of the present invention.
Figure 2:
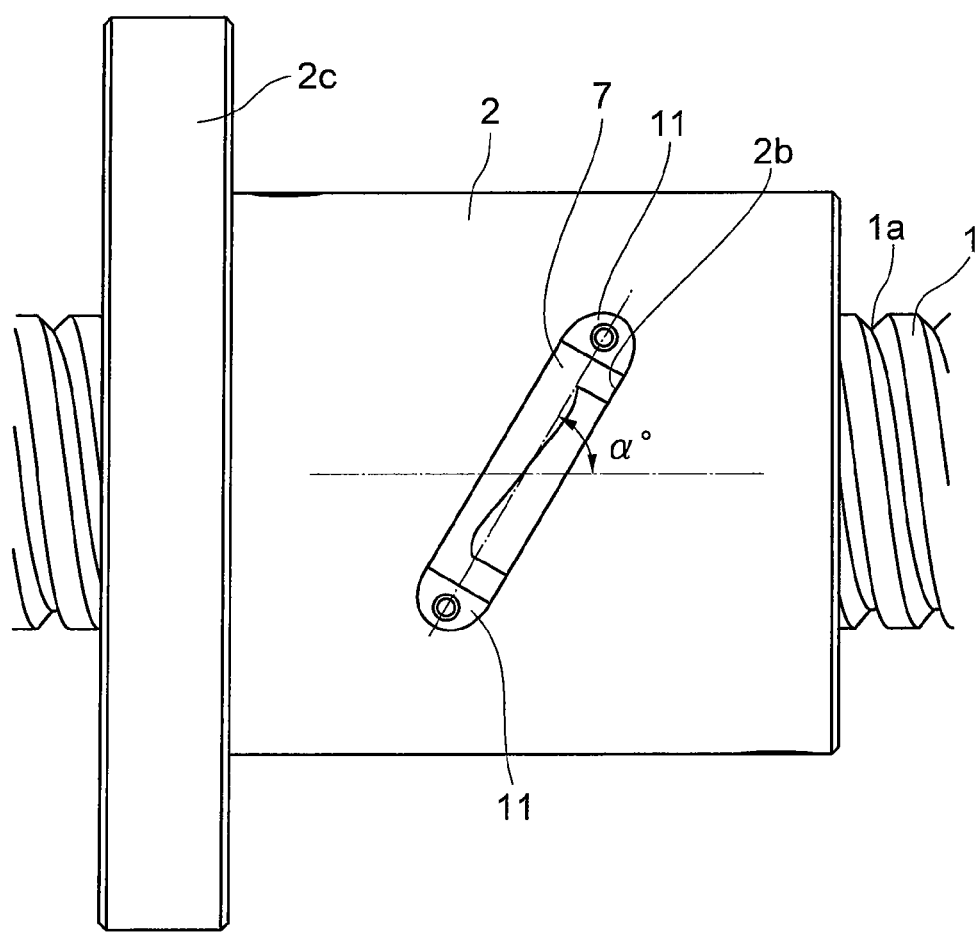
FIG. 2 is a plan view showing the roller screw.
Figure 3:
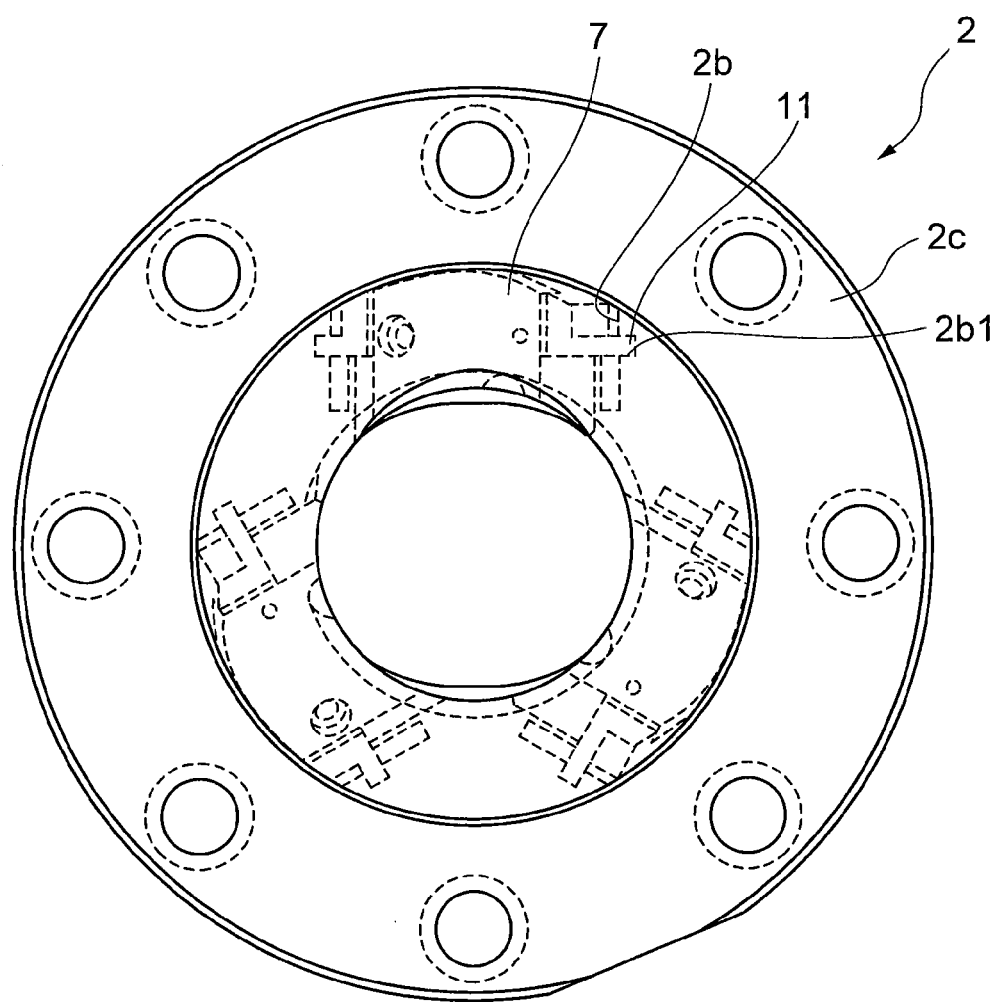
FIG. 3 is a frontal view showing the roller screw, the frontal view being viewed along the axial direction of a roller shaft.

FIGS. 1 to 3 show a roller screw according to a first embodiment of the present invention. FIG. 1 shows a perspective view of the roller screw, FIG. 2 shows a plan view, and FIG. 3 shows a frontal view obtained when viewed along an axial direction of a screw shaft.

The roller screw includes a screw shaft 1 having an outer peripheral surface on which a spiral roller-rolling surface 1a is formed and a nut 2 having an inner peripheral surface on which a spiral loaded roller-rolling surface 2a is formed to be opposed to the roller-rolling surface 1a. Between the roller-rolling surface 1a of the screw shaft 1 and the loaded roller-rolling surface 2a of the nut 2, a plurality of loaded roller-rolling paths 6 (refer to FIG. 14) each having less than one turn are arranged. Deflectors 7 are attached to the nut 2, wherein the deflector serves as a circulation member to circulate rollers and connects both ends, i.e., one end and the other end, of the loaded roller-rolling paths 6. In the present embodiment, a plurality of roller circulation paths (for example, three roller circulation paths) are provided, so that the deflectors 7 are also plural in number (for example, three deflectors). The plurality of deflectors 7 are arranged at different locations in an axial direction of the nut 2 and placed in each of placing holes 2b of the nut 2, in which placing holes are located at equal intervals in a circumferential direction of the nut 2.

The screw shaft 1 is produced such that the spiral roller-rolling surface 1a with predetermined leads is formed on the outer peripheral surface of a bar steel made of carbon steel, chrome steel, stainless steel, or other materials through a cutting, grinding, or rolling process. The roller-rolling surface 1a is formed to have the screw shaft 1 has a V-shaped section with an opening angle of approximately 90 degrees. In the present embodiment, the roller-rolling surface 1a formed on the outer peripheral surface of the screw shaft 1 is a two-rail roller-rolling surface. The number of rails on the screw shaft 1 can be set to various amounts such as one rail, two rails, or three rails.

Figure 5:
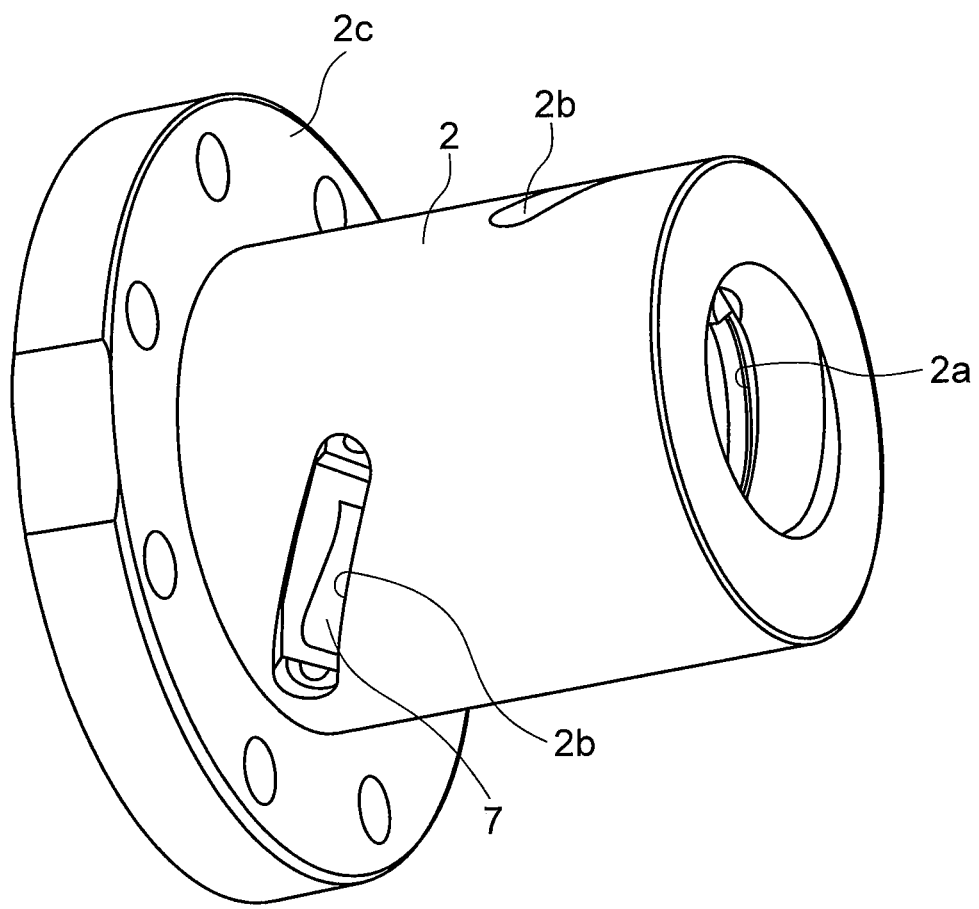
FIG. 5 is a perspective view showing the nut.

The nut 2 is produced such that the spiral loaded roller-rolling surface 2a with predetermined leads is formed on the inner peripheral surface of a cylinder made of carbon steel, chrome steel, stainless steel, or other materials through a cutting, grinding, or rolling process (FIG. 5). The loaded roller-rolling surface 2a is formed to have a V-shaped section with an opening angle of approximately 90 degrees. The nut 2 has an outer circumference having both ends in an axial direction thereof and a flange 2c is formed at one of the ends for allowing the nut 2 to be attached to an objective component.

As shown in FIG. 3, the placing holes 2b are a plurality of holes each formed to pass through the outer and inner peripheral surfaces of the nut 2. These plural placing holes 2b are arranged at different positions mutually shifted in the axial direction of the nut 2 but equal intervals in a circumferential direction of the nut 2. Each of the placing holes 2b is a long hole of which opening is narrow but extended to be in accordance with the outer shape of each of the deflectors 7. In the plan view showing the nut 2, each placing hole 2b is tiled by an angle a from the axial direction of the screw shaft (refer to FIG. 2). Each of the placing holes 2b is located to connect the one end and the other end of the loaded roller-rolling surface having less than one turn, which surface is formed on the inner peripheral surface of the nut 2. In the placing hole 2b, there is formed a mounting seat 2b1 on which a flange 11 given to the deflector 7.

In each of the placing holes 2b, the deflector 7 is placed. The flange 11 of the deflector 7 is seated on the mounting seat 2b1, and connection means such as bolts are screwed into the mounting seat 2b1 through the flange, whereby the deflectors 7 can be secured to the nut 2. On each deflector 7, an unloaded return path is formed so as to connect the one end and the other end of the loaded roller-rolling surface 2a having less than one turn, which surface is formed on the nut 2.

Figure 14:
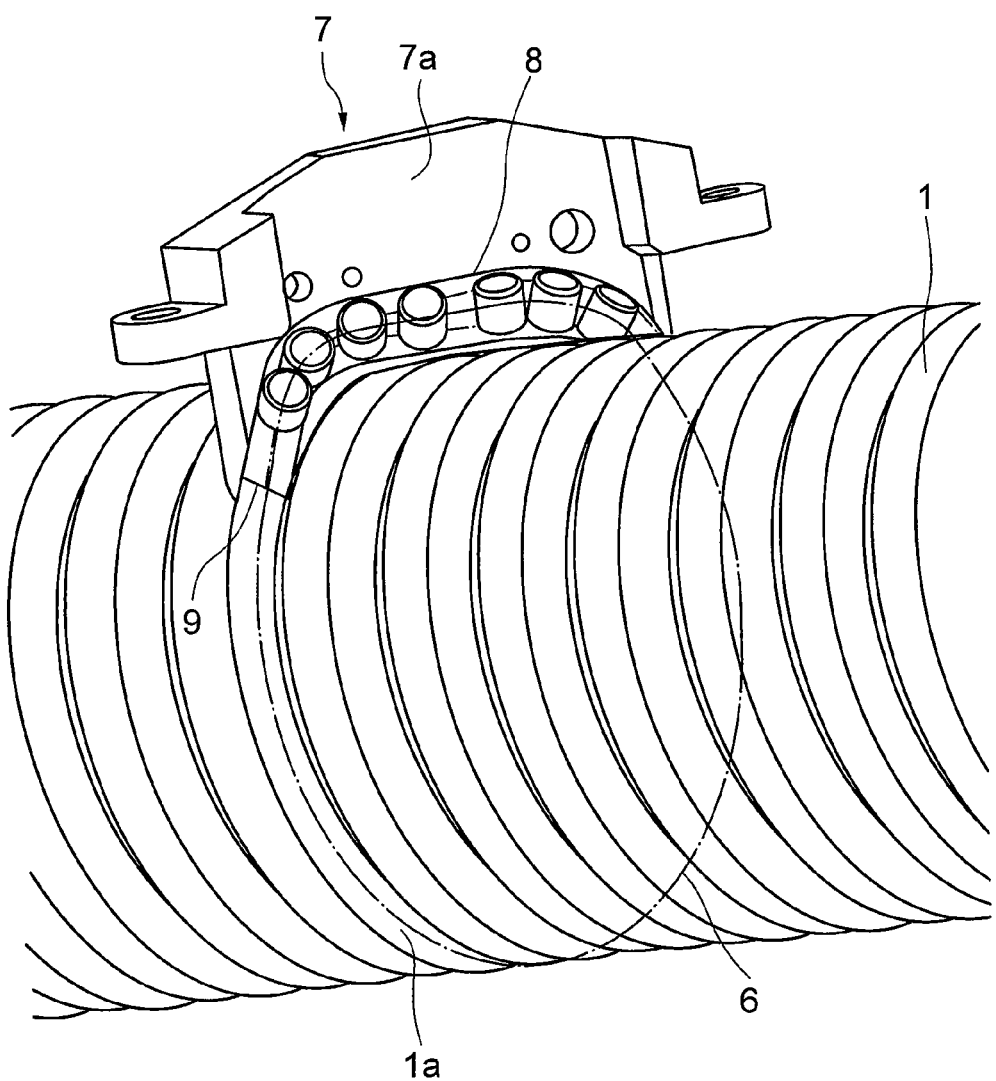
FIG. 14 is a perspective view showing both the screw shaft and the deflector.

A roller circulation path with one turn is produced by the loaded roller-rolling paths 6 formed between the roller-rolling surface 1a of the screw shaft 1 and the loaded roller-rolling surface 2a of the nut 2 and the unloaded return path 8 of the deflector 7 (refer to FIG. 14). The number of turns of the loaded roller-rolling paths 6 is over than 0.5 turns, and set for example in a range of 0.6 to 0.8 turns. A large number of rollers are arranged in the roller circulation path.

Figure 4:
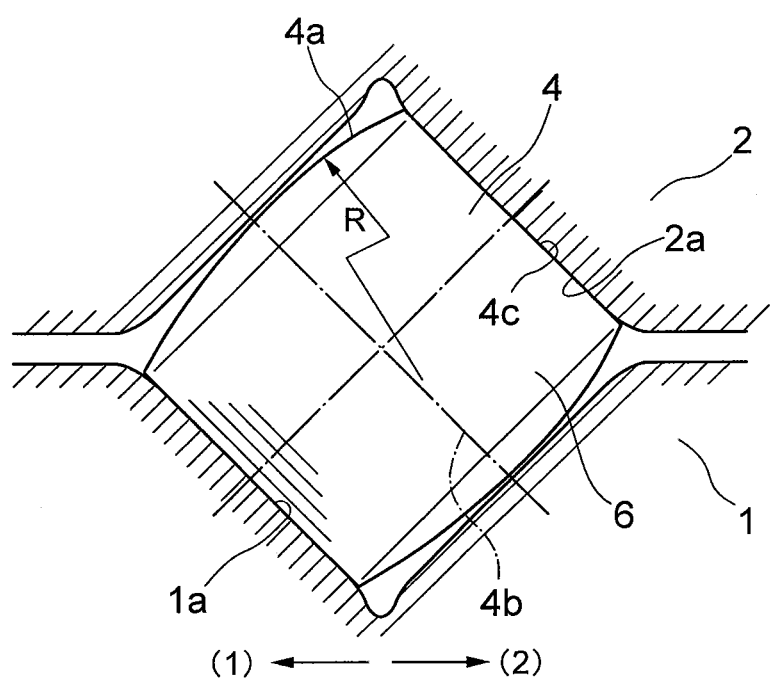
FIG. 4 is a sectional view showing rollers arranged between the roller-rolling surface of the roller shaft and the loaded roller-rolling surface of a nut.

FIG. 4 exemplifies a roller 4 disposed between the roller-rolling surface 1a of the screw shaft 1 and the loaded roller-rolling surface 2a of the nut 2. Each roller 4 is cylindrical and has a diameter and a length which are approximately equal to each other. When the roller 4 is viewed from its side, the shape of the roller is almost square. The roller 4 has end faces 4a which is subjected to arch-shaped or spherical chamfering. In the loaded roller-rolling paths 6, the rollers 4 are parallel-arranged so that the axial lines of mutually adjacent rollers 4 become substantially parallel with each other or cross-arranged so that the axial lines of mutually adjacent rollers 4 cross with each other. Retainers may be arranged between mutually adjacent rollers 4 in order to avoid contact therebetween.

Each of the rollers 4 has a side face 4c which comes in contact with both the roller-rolling surface 1a of the screw shaft 1 and the loaded roller-rolling surface 2a of the nut 2 so that the side face sustain load. However, the end faces 4a of the roller 4 do not sustain the load. Hence, each roller 4 is able to sustain the load in only one direction along the axial direction of the screw shaft 1. When the rollers 4 are cross-arranged, each roller can sustain the load in mutually opposite directions (directions shown by (1) and (2) in the figure). In contrast, the parallel arrangement of the rollers enables the rollers 4 to sustain the load in only one direction (direction shown by (1) or (2) in the figure). If it is desired to sustain the load in the mutually opposite directions (directions shown by (1) and (2) in the figure), the axial lines 4b of the parallel-arranged rollers 4 may be differentiated in their directions from each other among the plural roller circulation paths.

Figure 6:
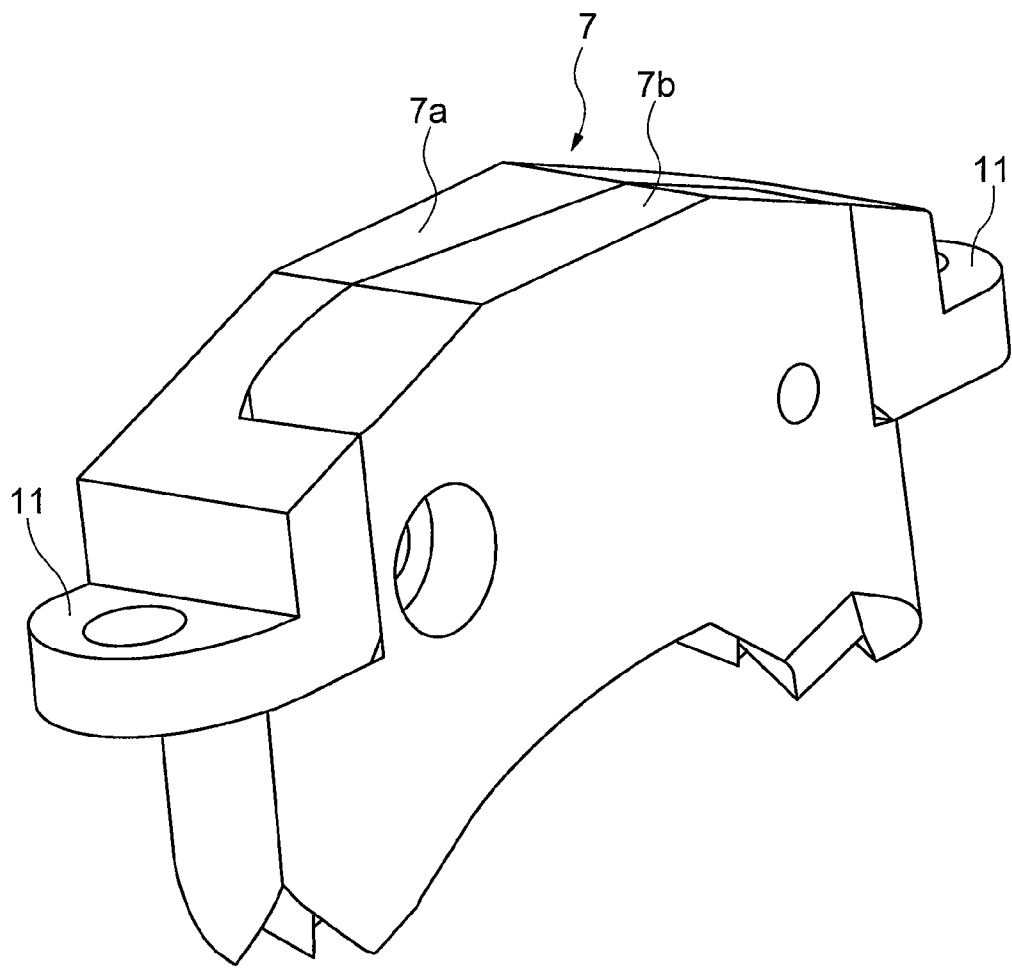
FIG. 6 is a perspective view showing a deflector.
Figure 7:
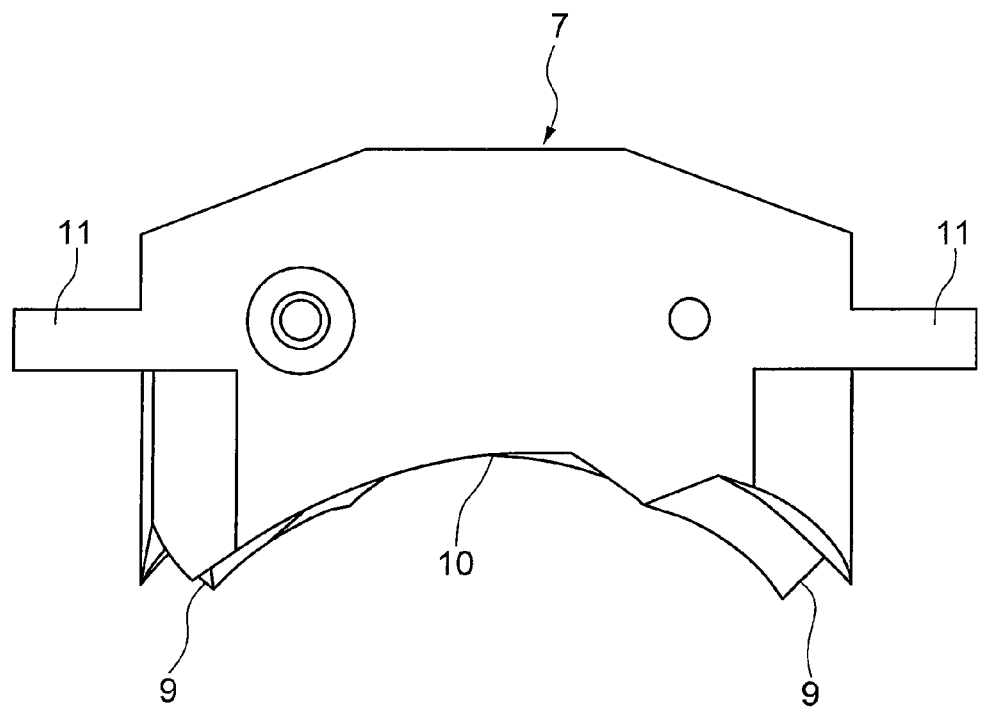
FIG. 7 is frontal view showing the deflector.

FIG. 6 shows a perspective view of each of the deflectors 7 and FIG. 7 shows the frontal view of the deflector 7. Each of the deflectors 7 consists of a pair of split members 7a and 7b which can be split into two pieces along the non-laded return path when being arranged. The deflector 7 has flanges 11 used to secure the deflector to the nut 7. As shown in FIG. 7, the deflector 7 has a lower surface with both ends located in its width direction and scooping-up proportions 9 are formed to protrude, respectively, from the ends toward the roller-rolling surface 1a of the screw shaft 1 when being arranged. The scooping-up portions 9 are in charge of scooping up the rollers 4 which have moved along the loaded roller-rolling paths 6, and guides the scooped-up rollers to the unloaded return path. Further, the deflector 7 has a lower surface in which a central part 10 in its width direction is recessed to be arched in order to avoid interference with the screw thread of the screw shaft 1.

Figure 8:
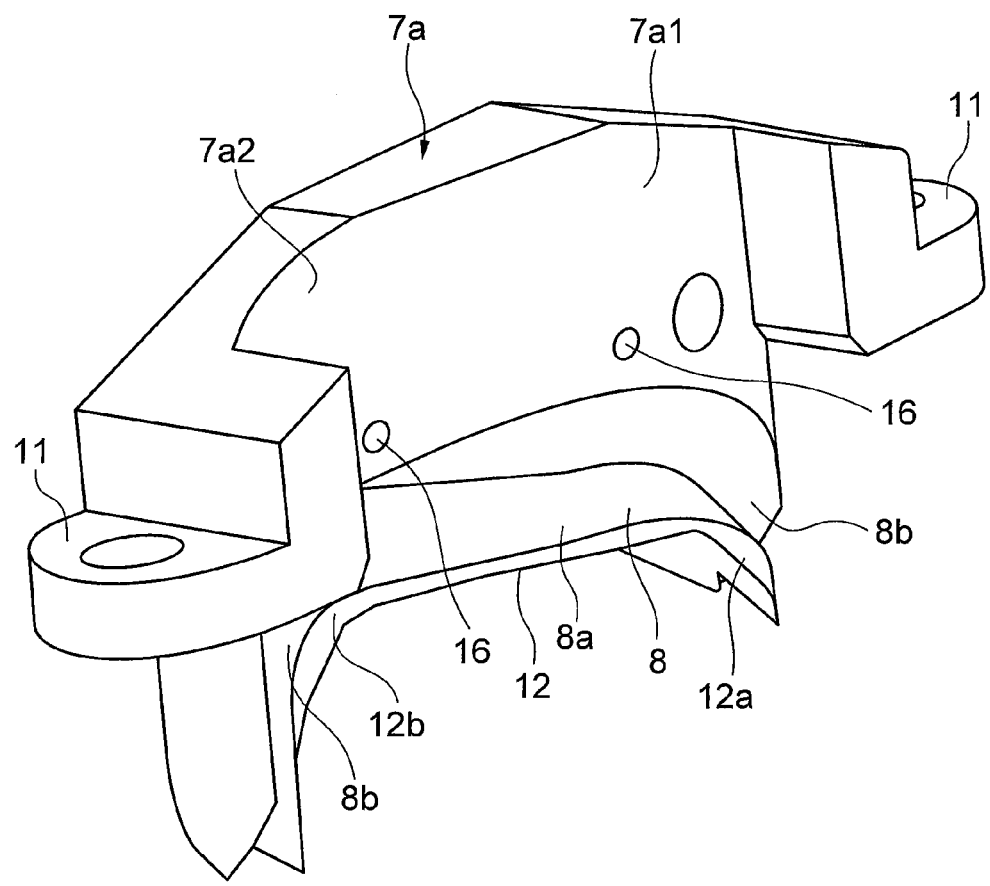
FIG. 8 is a perspective view showing one of split members of the deflector.
Figure 9:
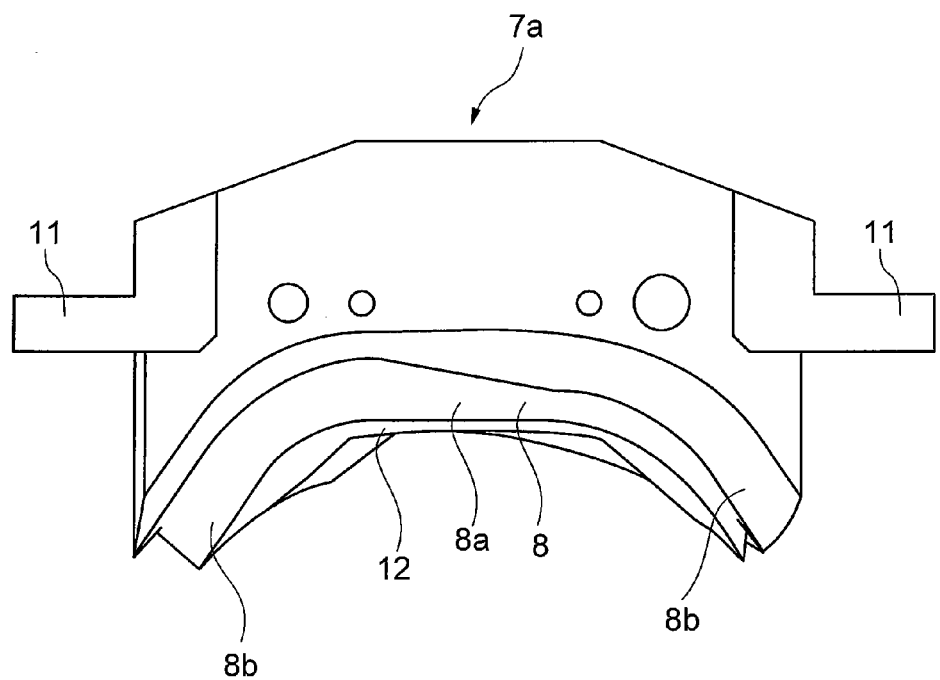
FIG. 9 is a frontal view showing the one of the split members of the deflector.
Figure 10:
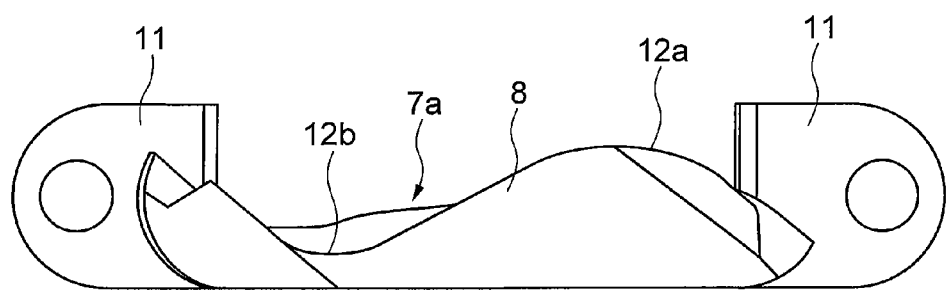
FIG. 10 is a bottom plan view showing the one of the split members of the deflector.

FIGS. 8 to 10 show one, 7a, of the split members, in which FIG. 8 shows its perspective view, FIG. 9 shows its frontal view, and FIG. 10 is its bottom view. The split member 7a is structured to have half of the unloaded return path 8. The unloaded return path 8 has a cross section whose shape is square in accordance with the side shape of each of the rollers 4 and which is twisted to make it possible to rotate the attitudes of the rollers moving along the unloaded return path 8. The deflector 7 is split into two pieces at a diagonal line of the square-section unloaded return path. The unloaded return path 8 consists of a linear central part 8a and curved end parts 8b continued from both ends of the central part. The central part 8a of the unloaded return path 8 is twisted. The split member 7a has a thick portion 7a1 and a thin portion 7a2 which agree, in shape, with the twist of the central part 8a of the unloaded return path 8. The unloaded return path 8 of the split member 7a has also a lower part with a wall portion 12. The unloaded return path 8, which is obtained by mutually combining the split members 7a and 7b, provides a closed section which is able to enclose the rollers 4. As shown in the bottom view of FIG. 10, the wall portion 12 has also a thick portion 12a and a thin portion 12b which agree, in shape, with the twist of the unloaded return path 8.

Figure 11:
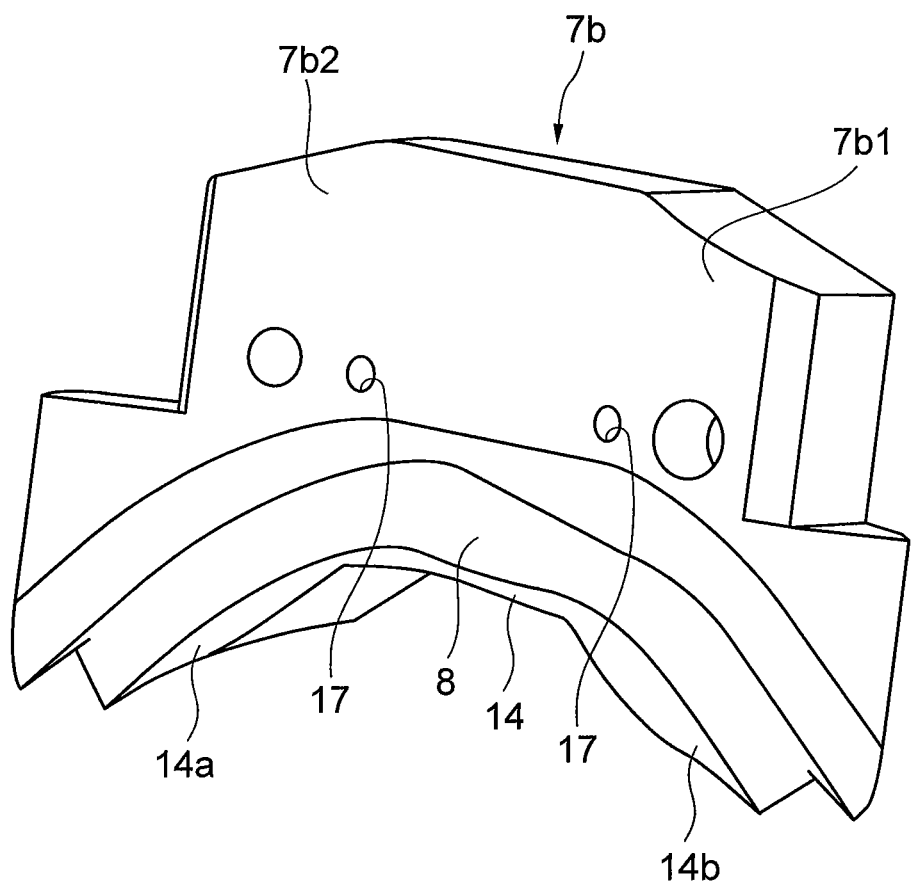
FIG. 11 is a perspective view showing the other of split members of the deflector.
Figure 12:
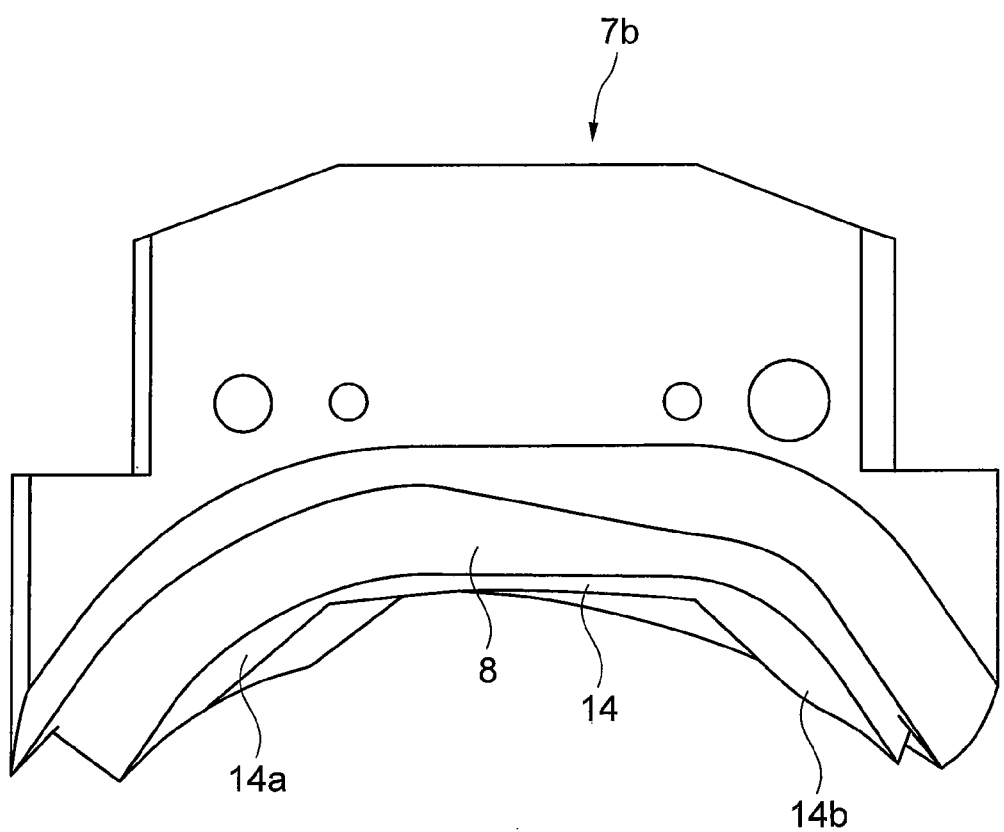
FIG. 12 is a frontal view showing the other of the split members of the deflector.
Figure 13:
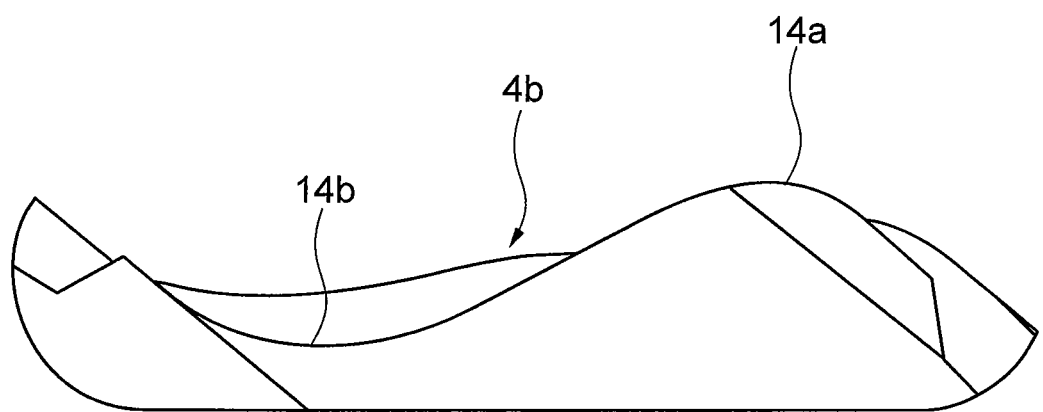
FIG. 13 is a bottom plan view showing the other of the split members of the deflector.

FIGS. 11 to 13 show the other, 7b, of the split members, in which FIG. 11 shows its perspective view, FIG. 12 shows its frontal view, and FIG. 13 is its bottom view. This split member 7b is also structured to have the remaining half of the unloaded return path 8. The unloaded return path 8 is twisted, so that, in accordance with the shape of its twist, the split member 7b has a thick portion 7b1 and a thin portion 7b2 as well. To give the unloaded return path 8 a closed section, there is also formed a wall portion 14 on the lower part of the unloaded return path 8 of this split member 7b. As shown in the bottom view of FIG. 13, the wall portion 14 has also a thick portion 14a and a thin portion 14b which agree, in shape, with the twist of the unloaded return path 8.

The split members 7a and 7b of the deflector 7 are produced by cutting work or injection molding of resin or metal. By dual splitting the deflector 7 along the diagonal line position of the unloaded return path 8, no undercut is caused, thereby facilitating the production of the split members 7a and 7b. Incidentally, the one, 7a, of the pair of split members has positioning pins 16 (refer to FIG. 8) and the other 7b has positioning holes 17 (refer to FIG. 11) into which the positioning pins 16 are fit. The positioning pins 16 and positioning holes 17 are used to position the pair of split members 7a and 7b, and split members are then combined with each other by combining means such as screws.

FIG. 14 illustrates the screw shaft 1 and the deflector 7 engaged with the screw shaft. In FIG. 14, the unloaded return path 8 of only one, 7a, of the split members is illustrated, making it easier to see how the rollers 4 move along the unloaded return path 8. As described before, the loaded roller-rolling surfaces each having less than one turn is formed between the loaded roller-rolling surface 2a with less one turn, of the nut 2, and the roller-rolling surface 1a of the screw shaft 1. The rollers which have reached the one end of the loaded roller-rolling paths 6 are scooped up by the scooping-up portions 9 of the defector 7. Since the section of the unloaded return path 8 is closed, the rollers 4 are able to enter the unloaded return path 8 without being touched to the screw threads of the screw shaft 1. The rollers 4 then moves along the unloaded return path 8, in which during the movement, the attitudes of the rollers 4 are slightly rotated. When the rollers 4 which have arrived at the end of the unloaded return path 8 are returned from the scooping-up portions 9 of the deflector 7 to the other end of the loaded roller-rolling paths 6. The reason of slightly rotating the roller attitudes during the unloaded return path 8 is that the roller attitudes should agree with the sectional shape of the loaded roller-rolling paths 6.

Figure 15:
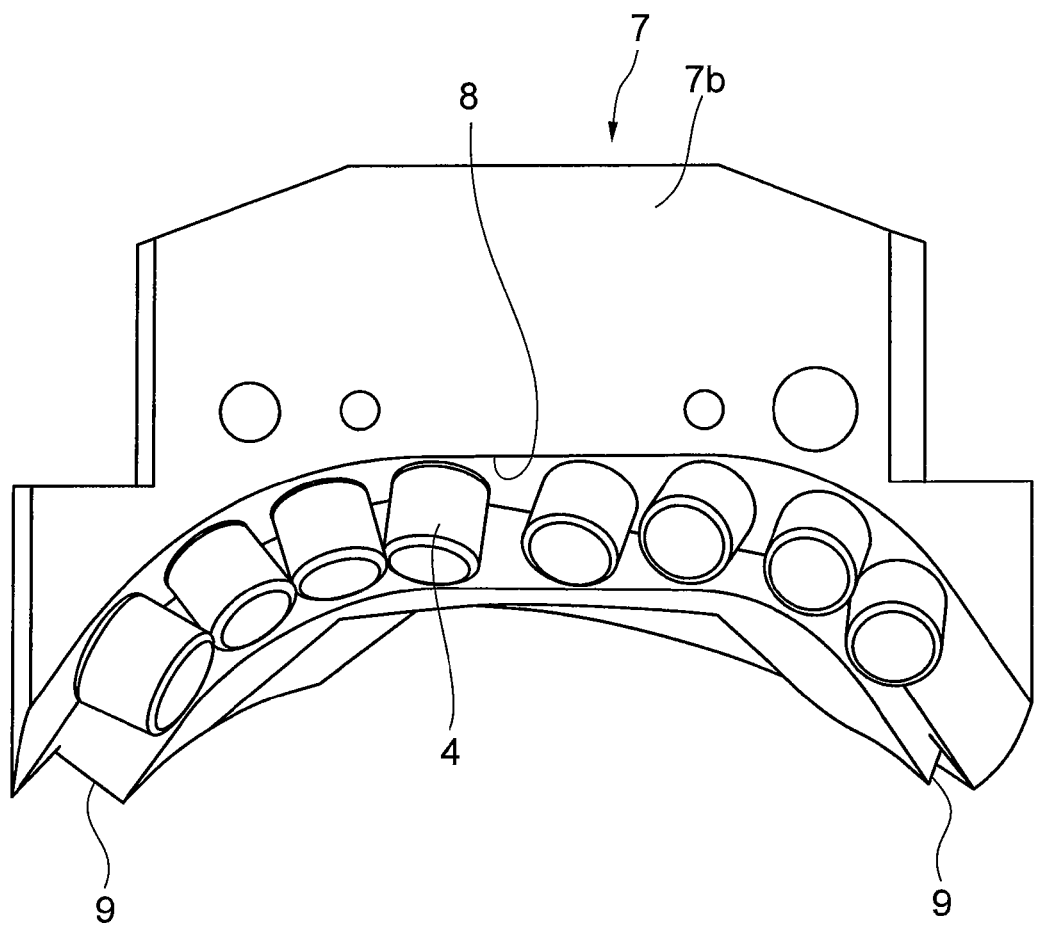
FIG. 15 is a frontal view showing the other or the split members (a view showing changes of attitudes of the rollers which move along an unloaded return path.

FIG. 15 illustrates the attitudes of the rollers 4 which move along the other of the split members. From this illustration, it is understandable that the rollers 4 rotate its attitudes as the rollers 4 advance along the unloaded return path 8 of the split member.

By making the number of turns of each of the loaded roller-rolling paths 6 less than one turn, it is possible to minimize the amount of twist of the unloaded return path 8. Additionally, making the number of turns of each of the loaded roller-rolling paths 6 less than one turn makes it possible to prevent the rollers 4 from tilting from their predetermined axial lines (that is, the rollers 4 from skewing), in which the tilt is attributable to deteriorated accuracy of machining the roller-rolling surface 1a of the screw shaft 1 and the loaded roller-rolling surface 2a of the nut 2 and a reduction in the number of rollers 4 arranged in the loaded roller-rolling paths 6.

Figure 16A:
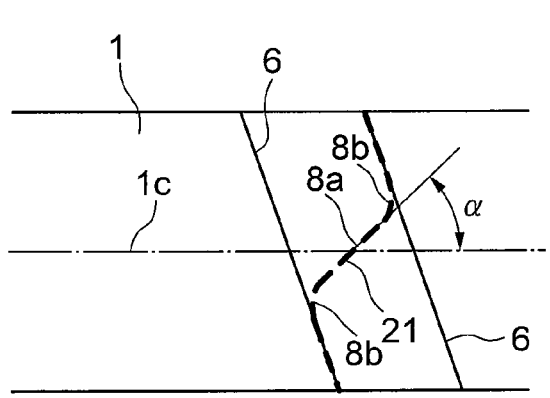
FIG. 16 is a view illustrating a relationship between a track along the central axis of the unloaded return path and the screw shaft (in this figure, (A) is a plane view of the screw shaft and (B) is a frontal view observed along the axial direction of the screw shaft)
Figure 16B:
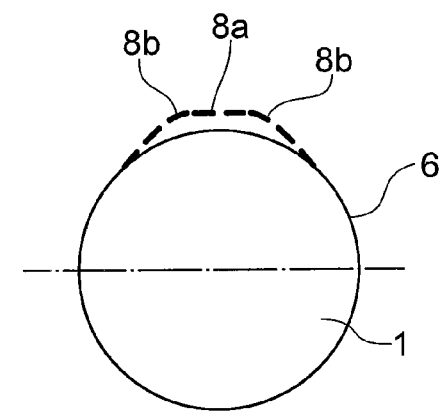

Furthermore, the circulation member is produced as the deflector 7, whereby the number of parts can be reduced compared to employing the conventional end cap type of circulation member. This advantage will reduce toppling actions of the rollers, which are due to clearances and steps existing between the parts FIG. 16 describes a relationship between a track 21 provided by the central line of the unloaded return path 8 and the screw shaft 1. As shown in the plan view of the screw shaft 1 provided by (A) of FIG. 16, the linear central part 8a of the unloaded return path 8 is made to tilt by a preset angle α to the axial line 1c of the screw shaft 1. Both curved end parts 8b of the unloaded return path 8 are continued, via arches, to the loaded roller-rolling paths 6 which are tilted in conformity with leads. As shown in the frontal view of the screw shaft 1 provided by (B) of FIG. 16, both end parts 8b of the unloaded return path 8 are arranged along tangential directions of the loaded roller-rolling paths 6. In the unloaded return path 8, arches connect the central part 8a and both end parts 8b.

Figure 17:
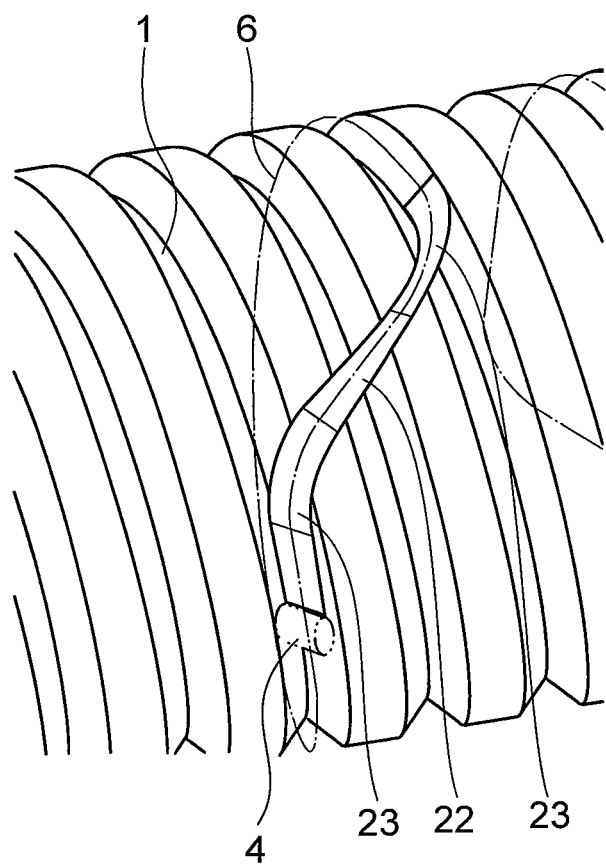
FIG. 17 is a perspective view showing a trajectory of the axial line of the rollers in the unloaded return path.

FIG. 17 describes a trajectory of the axial line of each roller 4 which moves along the unloaded return path 8. In this figure, a reference 22 shows a trajectory of the central part 8a of the unloaded return path 8 and references 23 show trajectories of both end parts 8b thereof. By providing the loaded roller-rolling paths 6 each having less than one turn, the amount of twist given to the central part 8a of the unloaded return path 8 can be made smaller and the rollers 4 which arrived at one end of each of the loaded roller-rolling paths 6 can be returned to the other end of each of the loaded roller-rolling paths 6, which is one-turn prior to the next one, without changing the attitudes of the rollers. Incidentally, the present embodiment provides the roller-rolling surface 1a of the screw shaft 1 with two rails, resulting in that the roller 4 which moves along the roller-rolling surface 1a of the screw shaft 1 is returned to every two roller-rolling surfaces 1a, not to the adjacent roller-rolling surface 1a.

Figure 18:
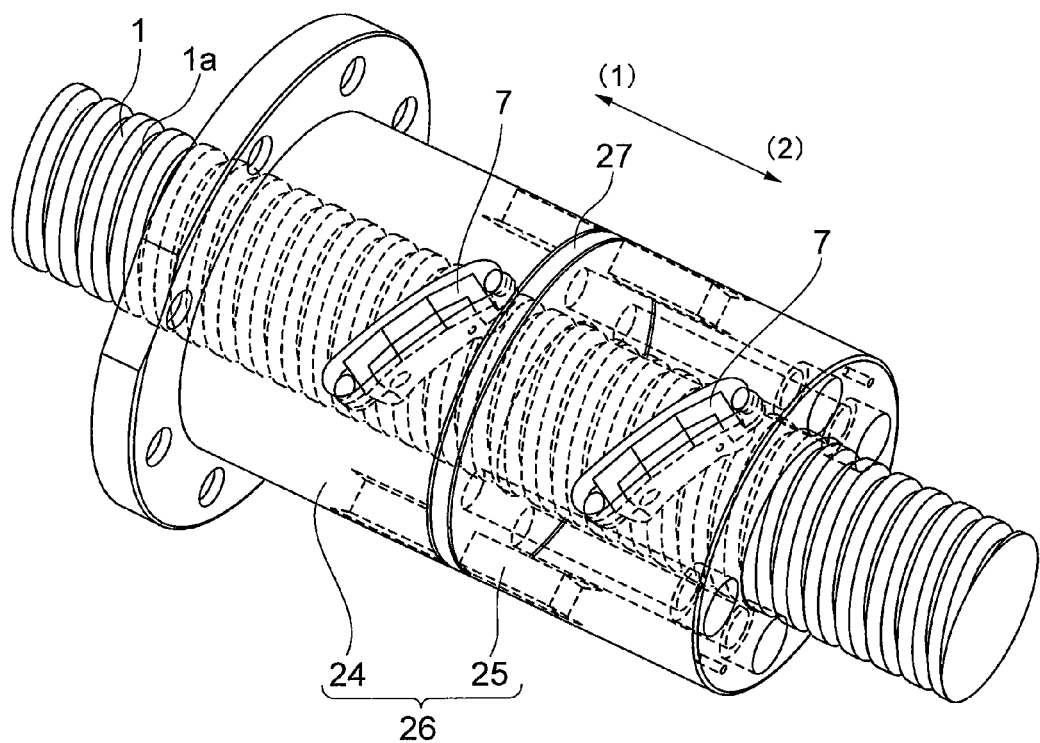
FIG. 18 is a perspective view showing a roller screw according to a second embodiment of the present invention.

FIG. 18 shows a roller screw according to a second embodiment of the present invention. In the roller screw according to the foregoing first embodiment, when the rollers 4 are parallel-arranged in the one-turn roller circulation path, application of a load is allowed in only one direction in the axial directions of the screw shaft 1. With taking this into consideration, the roller screw according to the present embodiment has a nut 26 produced by combining two divided nuts 24 and 25 in their axial direction so that a load can be applied in mutually opposite two directions along the axial directions of the screw shaft 1. Each of the divided nuts 24 and 25 has a plurality of one-turn roller circulation paths which are produced in the same manner as the nut 2 described in the foregoing embodiment and a plurality of deflectors 7. Each deflector 7 has the same structure as that described in the foregoing first embodiment, so that the same reference numerals as those before are used herein to simplify the description.

One of the divided nuts, 24, has a roller circulation path in which a plurality of rollers are arranged in parallel to allow a load to be applied in one direction of the axial directions of the screw shaft 1. Meanwhile, the other of the divided nuts, 25, has a roller circulation path in which a plurality of rollers are arranged in parallel to allow a load to be applied in the opposite direction to the applying direction of the divided nut 24 in the axial directions of the screw shaft 1. Between the paired divided nuts 24 and 25, there is provided a shim 27 which has the capability of connecting the nuts with their phases made to agree with each other. The pair of nuts 24 and 25 are mutually connected by connection means such as bolts.

On the screw shaft 1, there are formed two-rail roller-rolling surfaces 2a. The rollers circulating along the roller circulation path of one, 24, of the divided nuts roll along one of the two-rail roller-rolling surfaces of the screw shaft 1. In contrast, the rollers circulating along the roller circulation path of the other divided nut 25 roll along the remaining one-rail roller-rolling surface 1a among the two-rail roller-rolling surfaces of the screw shaft 1.

The present invention will not be limited to the scopes set forth in the foregoing embodiments, and can be modified into various examples as long as such examples are within the subject matter of the present invention. For example, the number of one-turn roller circulation paths to one nut may be one or more, such as two, three, and more than three. In addition, instead of using the cylindrical roller, a tapered roller with a tapered side can be used as the roller.

The present specification is based on Japanese Patent Application No. 2007-309609 filed on Nov. 30, 2007, the entire contents of which are expressly incorporated by reference herein.

The invention claimed is:

1. A roller screw comprising:
a screw shaft having a spiral roller-rolling surface on an outer peripheral surface thereof;
a nut having a spiral loaded roller-rolling surface on an inner peripheral surface thereof, the loaded roller-rolling surface being opposed to the roller-rolling surface of the screw shaft;
a circulation member arranged in the nut and formed to have an unloaded return path connecting one end and the other end of the loaded roller-rolling surface, whose turn number is less than one, of the nut; and
a plurality of rollers arranged in a one-turn roller circulation path composed by a loaded roller-rolling path having less than one turn between the roller-rolling surface of the screw shaft and the loaded roller-rolling surface of the nut and an unloaded return path of the circulation member,
wherein the circulation member is formed to guide the rollers which have rolled and arrived at one end of the loaded roller-rolling path of less than one turn to the unloaded return path and to return the rollers to the other end of the loaded roller-rolling path of less than one turn, when the screw shaft is relatively rotated to the nut,
the unloaded return path of the circulation member has a cross section closed to enclose the rollers which is square in conformity with a shape of a side surface of each of the rollers, and having a linear central part and curved end parts,
the linear central part of the unloaded return path is twisted so as to rotate attitudes of the rollers which move along the unloaded return path,
the circulation member is formed by combining two split members split at a position of a diagonal line across the full length of the unloaded return path of which cross section is square, and
mating surfaces of a pair of the two split members are twisted in accordance with the linear central part of the twisted unloaded return path.

2. The roller screw of claim 1, wherein the circulation member has scooping-up portions arranged at both ends of the unloaded return path in a length direction thereof, the scooping-up portions scooping up the rollers which have moved in the loaded roller-rolling path into the unloaded return path.

3. The roller screw of any one of claim 1 or 2, wherein the number of turns of the loaded roller-rolling path having less than one turn is over 0.5 turns.

4. The roller screw of claim 1 or 2, wherein the nut has a placing hole which has a shape corresponding to a shape of the circulation member, which is through from an outer peripheral surface of the nut to an inner peripheral surface thereof, and which extends in a long and thin form from one of both ends of the loaded roller-rolling surface of less than one turn to the other end thereof, and the circulation member is placed in the placing hole of the nut.

* * * * *